(No Model.)
C. W. LEUBNER.
WASHING MACHINE.
No. 436,794. Patented Sept. 23, 1890.
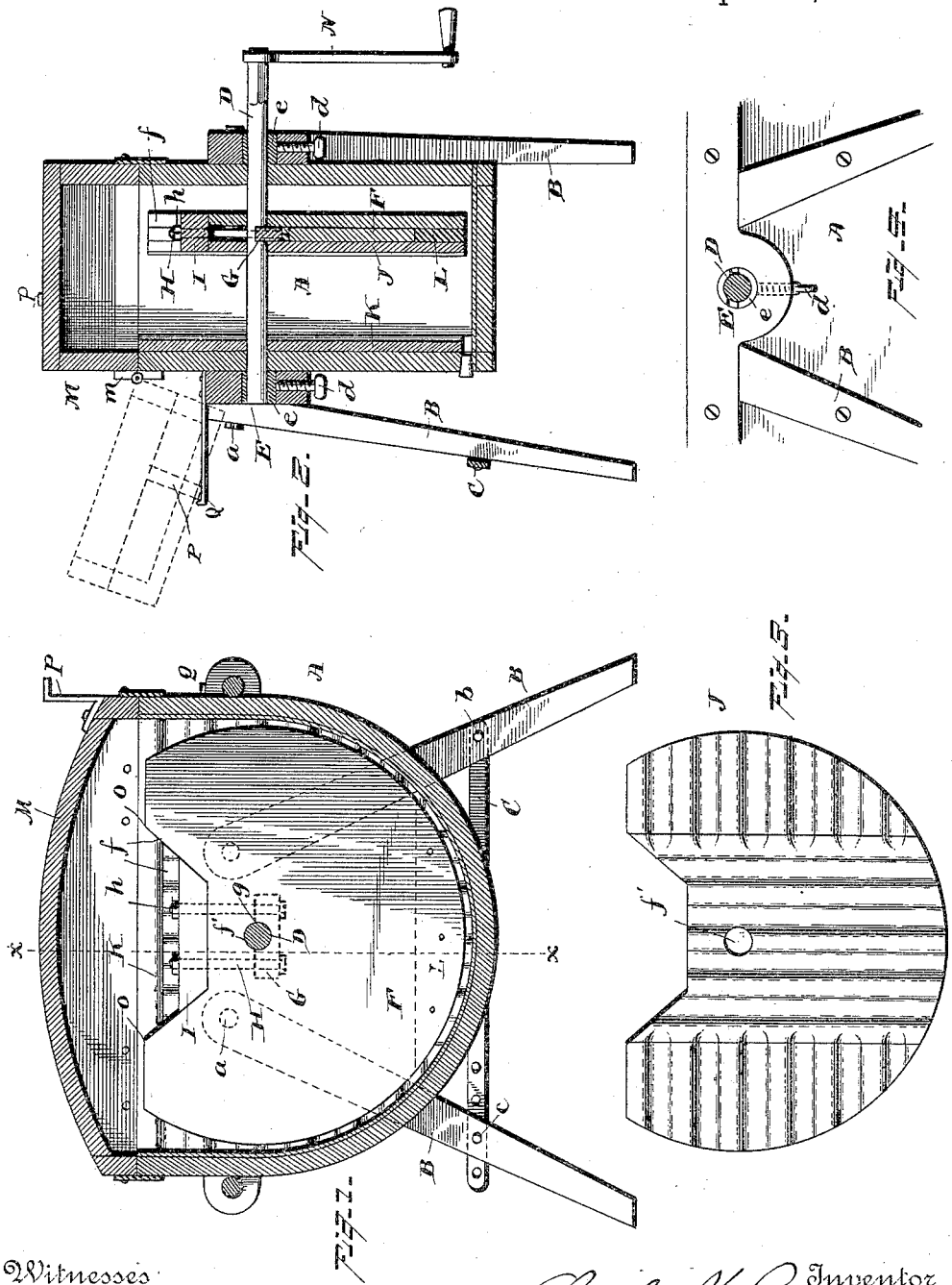

UNITED STATES PATENT OFFICE.

CHARLES W. LEUBNER, OF McGREGOR, TEXAS.

WASHING-MACHINE.

SPECIFICATION forming part of Letters Patent No. 436,791, dated September 23, 1890.

Application filed April 14, 1890. Serial No. 347,902. (No model.)

*To all whom it may concern:*

Be it known that I, CHARLES W. LEUBNER, a citizen of the United States, residing at McGregor, in the county of McLennan and State of Texas, have invented certain new and useful Improvements in Washing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in washing-machines, its objects being to provide a machine having an oscillating and revolving rubber, means for securing the rubber to the operating-shaft, and to provide bearings for said shaft which may be adjusted to compensate for any wear of parts.

A further object is to provide adjustable legs, whereby one side of the machine may be raised or lowered, thus decreasing or increasing the pressure of the rubber upon the articles being washed.

The invention consists in the particular construction and combination hereinafter described and claimed to accomplish said objects.

In the drawings, Figure 1 is a longitudinal section through a machine constructed in accordance with my invention. Fig. 2 is a cross-section of the same, taken on the line $x$ $x$ of Fig. 1. Fig. 3 is a side elevation of the rubber, and Fig. 4 is a detail view of the bearing for the operating shaft.

Referring to the drawings, the tub or box A is provided with legs B, the forward two being secured firmly to the tub, while the rear two are pivoted at their upper ends, as at $a$.

A bar C of metal or other suitable material is pivoted at $b$ to one of the rear legs, its free end being provided with perforations or notches to engage a pin or bolt $c$, in the opposite rear leg. The purpose of this construction will be hereinafter described.

The operating-shaft D is secured in suitable bearings E, so as to have a longitudinal movement therein, which bearings are made adjustable by means of a set-screw $d$, which bears against the lower plate $e$ of the bearing. It will be seen by this construction that any wear in the bearings or shaft may be taken up by simply turning the set-screw $d$.

A disk or wheel F, substantially semicircular, as shown, and having a wedge-shaped notch $f$ cut in its upper edge, is secured to the operating-shaft in the following manner: A circular opening $f'$ is made through the disk F, of a sufficient diameter to permit it to neatly slide upon the shaft D. A rectangular block of metal or other suitable material G, having a groove $g$ in its upper face, is first placed in a recess or hollow space between the sides of the rubber so as to lie under the shaft afterward passed through the disk F, the groove encircling the shaft. Headed bolts H pass through perforations in block G, and thence up, one on each side of the shaft, where they pass through another rectangular block I, set in the wedge-shaped notch $f$ of the disk F, and resting on said disk. These bolts are provided at their upper ends with nuts $h$. It will be apparent that by tightening these nuts the block G will be drawn against the shaft, and thus securely clamp the disk upon it in any desired position.

The rubbers J and K, formed of slats or cleats, or in any suitable way to form corrugations, as shown, are secured to the disk and to the adjacent side of the tub respectively. A weight L is secured near the bottom of the disk F to weight the rubber, which gives the latter an even oscillating motion and returns it always to the proper position, the weight being set into a recess preferably formed between the two side pieces and central filling-piece of the disk, as shown in Fig. 2, and nailed or otherwise secured therein, as illustrated in Fig. 1.

The lid M of the washer is hinged at its rear side by means of hinges $m$, and has secured around its outer edges a strip of rubber, heavy canvas, or the like, which, when the lid is closed, covers the crack between the lid and the tub, thus preventing the suds from running out upon the machine or floor. This lid when open serves as a receptacle on the side of the tub to receive the clothes, which will be lifted up to it by the projections $o$ at the ends of the plane portion of the oscillating rubber and which are formed by the recess $f$.

In order to relieve the hinges of strain when opened, I attach a projection or strap P at a suitable point on the lid and a laterally-extending arm Q on another part of the machine—say extending from the side—all as shown in Fig. 2, so that when the lid is thrown open the projection or strap will bear on the arm Q and the lid or cover thus braced and supported so as to take the strain from off the hinges.

A handle N is secured on one end of the shaft for operating the washer. The end of the shaft is made angular to receive the handle and allow it to be shifted to different angles or positions.

The operation of my invention is as follows: The articles to be washed are placed within the tub between the rubbers J and K. Sufficient quantity of water is now poured in upon them and the lid closed. The two rear legs of the machine are now spead apart the desired distance and secured by means of the perforated cross-arms, as above described, which lowers the rear end of the machine, thus causing the operating-shaft which fits loosely within its bearings and the rubber attached thereto to slide in that direction, and thus press upon the articles in the tub. The pressure is regulated by the slant given the tub. The rubber is now oscillated by means of the operating-handle until the articles are sufficiently cleansed. The lid is now thrown back and the rubber given an entire revolution, when the corners formed on the upper edge of the disk and rubber will lift the articles from the tub, when they may be deposited in the lid of the machine in access of the wringer, which may be fastened to the side of the tub.

The tub is provided near the bottom with the usual opening for allowing it to be emptied when desired.

While I have described the rubbers as being only on one side of the disk and of the tub, yet they may be placed on both sides without departing from the spirit of my invention, and so, also, may other changes be made without departing from the invention, although the details of construction described are considered to be the best.

Having thus described my invention and set forth its merits, what I claim as new, and desire to secure by Letters Patent, is—

1. The combination, with the body of the tub and the shaft passing through it, of the rubber supported by the shaft and having a wedge-shaped recess therein, a block fitting in said recess, a block below the shaft, and means connecting the two blocks and clamping the rubber to the shaft, substantially as and for the purposes set forth.

2. The combination, with the tub and its segmental rubber, of the blocks above and below the shaft of the rubber and connected together by clamping-bolts to clamp the rubber to the shaft, the concave bearings in which the shaft rests, and the set-screw for adjusting said bearings to the shaft, substantially as and for the purposes set forth.

3. The combination, with the body of the tub and the segmental rubber mounted on a shaft passing through the tub, of the hollow cover of smaller interior dimensions than the body of the tub to prevent the rubber from making a complete revolution when closed and hinged to the body to form an open receptacle suspended from the side of the tub to receive the clothes as they are delivered from the tub by the projections to the segmental rubber, substantially as and for the purposes set forth.

In testimony whereof I affix my signature in presence of two witnesses.

CHARLES W. LEUBNER.

Witnesses:
D. O. BRIGGS,
CHARLES BANDO.